United States Patent
Swenson

[11] Patent Number: 5,829,823
[45] Date of Patent: Nov. 3, 1998

[54] POST CARRIAGE FOR A BOX-SHAPED CARGO BODY OF A TRUCK

[75] Inventor: Duane A. Swenson, Brookfield, Wis.

[73] Assignee: Sliding Systems, Inc., Wauwatosa, Wis.

[21] Appl. No.: 985,623

[22] Filed: Dec. 5, 1997

Related U.S. Application Data

[63] Continuation of Ser. No. 604,597, Feb. 21, 1996.

[51] Int. Cl.⁶ .................................................... B60D 7/00
[52] U.S. Cl. ............................ 296/183; 296/155; 296/43; 16/103; 160/196.1
[58] Field of Search ............................. 296/43, 155, 181, 296/183, 147, 148; 16/87 R, 91, 103; 160/196.1

[56] References Cited

U.S. PATENT DOCUMENTS

| | | | |
|---|---|---|---|
| 520,199 | 5/1894 | Witt | 16/103 |
| 536,613 | 4/1895 | Erskine | 16/103 X |
| 942,860 | 12/1909 | Lawrence | 16/103 |
| 1,041,053 | 10/1912 | Evans | 16/103 X |
| 1,090,306 | 3/1914 | Hoffman | 16/103 X |
| 1,165,329 | 12/1915 | Frantz | 16/103 |
| 1,178,065 | 4/1916 | Ferris | 16/103 |
| 1,192,966 | 8/1916 | Willard | 16/103 X |
| 1,621,717 | 3/1927 | Grant et al. | 160/196.1 X |
| 1,689,665 | 10/1928 | Cramp | 16/103 |
| 3,428,999 | 2/1969 | Benson, Jr. | 16/103 |
| 3,793,673 | 2/1974 | Lawrence, Jr. | 16/103 X |
| 4,437,410 | 3/1984 | Stoller, Sr. et al. | 160/196.1 X |
| 4,861,094 | 8/1989 | Krueger | 296/181 |
| 4,943,110 | 7/1990 | Pastva | 296/155 X |
| 4,952,009 | 8/1990 | Mountz et al. | 296/181 |

FOREIGN PATENT DOCUMENTS

| | | | |
|---|---|---|---|
| 47022 | 3/1982 | European Pat. Off. | 296/43 |
| 2444605 | 8/1980 | France | 296/155 |

*Primary Examiner*—Joseph D. Pape
*Attorney, Agent, or Firm*—Anderson, Kill & Olick, P.C.

[57] ABSTRACT

A post carriage for a box-shaped cargo body having a cargo platform and two side bars extending along the cargo platform and supported on the platform by a plurality of posts including at least one post releasably secured to the platform and displaceable along a side bar, the post carriage including a connection plate for connecting the at least one post to the post carriage, a pair of track rollers displaceable along a guide rail provided on the side bar, and a roller trolley for supporting the track rollers.

9 Claims, 3 Drawing Sheets

POST CARRIAGE FOR A BOX-SHAPED CARGO BODY OF A TRUCK

RELATED APPLICATION

This application is a continuation of application Ser. No. 08/604,597, filed Feb. 21, 1996.

BACKGROUND OF THE INVENTION

The present invention relates to a post carriage for a box-shaped cargo body of a commercial vehicle, in particular, of a truck. More particularly, the present invention relates to a post carriage for a box-shaped cargo body including a cargo platform, two side bars extending along a longitudinal extent of the cargo platform in a spaced relationship, and a plurality of upright posts for supporting the side bars on the cargo platform and including at least one post having a lower end thereof releasably attached to the cargo platform and having an upper end thereof supported at one of the side bars for displacement along the one side bar.

The above-described cargo bodies for commercial vehicles, in particular, trucks are primarily, if not exclusively, used in commercial vehicles the cargo space of which is closed with a canvas bearing structure. A drawback, associated with such cargo bodies, consists in that the bar supporting posts are provided not only at both ends of the cargo platform but also between the two ends, and the intermediate posts present an obstacle during the loading of the cargo space or the cargo platform. Therefore, it was proposed to make one or several intermediate posts so that they can be releasably attached to the cargo platform and are displacably supported on the side bars whereby the post or posts could be longitudinally displaced to provide a sidewise access to the cargo platform, if needed, in case the posts interfere with the loading operation. The longitudinal displacement of the post or posts along the cargo platform enables to effect loading at any required location, without the post or posts interfering with the loading operation. However, the roller devices, which were used up to the present for suspending the displaceable posts from the side bards, were relatively complicated and, therefore, expensive to produce. Furthermore, the conventionally used roller devices did not provide a necessary stability of the structure especially when it was designed as a canvas bearing structure.

Accordingly, an object of the invention is providing a post carriage for the above-described cargo body which can be easily and, thereby, cost-effectively produced and installed.

Another object of the present invention is a post carriage for the above-described cargo body which would insure a required stability of the structure, would be easily accessible and would have good traveling characteristics.

SUMMARY OF THE INVENTION

These and other objects of the invention, which will become apparent hereinafter, are achieved by providing a roller trolley for supporting a pair of track rollers for displacement along a guide rail mounted on a side bar, and means for connecting the displaceable post with the trolley. The use of the inventive post carriage, on one hand, facilitates the connection of the displaceable post with the side bar and insures the necessary stability and, on the other hand, facilitates the displacement of the post along the side bar, i.e., along the cargo platform.

According to the preferred embodiment of the invention, the roller trolley includes a chassis formed as a support bolt, and the connecting means is formed as a connection plate supported on the support bolt. The roller trolley further has two roller carriers supported on the support bolt on opposite sides of the connection plate, respectively, for supporting each a track roller. The connection plate is formed as a hinge plate having an end thereof supported on the support bolt formed as a gudgeon pivotable about the support bolt. Forming the connection plate as a hinge plate significantly facilitates its production as the hinge plate can be formed by a section of a standard hinge strip.

According to a further development of the invention, the track roller is formed as twin roller supported on a common axle, with the roller carrier having a flat portion engaging the common axle in a region between two rollers forming the twin roller.

Each roller carrier is formed of at least one folded flat material section having at one end thereof a flat portion forming the axle engaging portion of the roller carrier, and having at another end thereof, an approximately cylindrical portion for receiving the support bolt.

According to still further development of the invention, the roller carrier is formed of two folded flat material sections forming the common axle engaging portion of the roller carrier, with the two folded sections abutting each other. The two folded sections are connected with each other by welding. Each folded section has, at its end remote from its portion which engages the common axle, an approximately cylindrical section which receives, at least partially, the support bolt.

According to the invention each of the roller carrier includes at least one jaw, located sidewise of the portion of the connection plate, which engages the common axle, for engaging the guide rail from beneath.

However, in order to more reliably prevent an undesirable jamming of the track rollers in the guide rail each roller carrier is provided with two jaws arranged, respectively, sidewise on opposite sides of the flat portion for engaging the guide rail from beneath. Each jaw has a portion extending parallel to a bottom of the guide rail to provide for engaging the guide rail from beneath. The extending portion has a support region formed of a wear-resistant plastic material.

Each of the rollers forming said twin roller is formed as a section of a ball to insure smooth running of the track roller and to make the rollers less susceptible to jamming. Such rollers are easily mountable on the roller trolleys. With this type of rollers, the common axle is formed as a clinch bolt on which the rollers are supported by a bearing sleeve.

According to another development of the invention, the support bolt is formed as a head bolt having a head thereof abutting an outer end surface of one of the roller carriers and having an end thereof remote from the head projecting beyond another of the roller carriers, the remote end of the head bolt being secured to another of the roller carriers with a shim surrounding the remote end and abutting an outer end surface of another of the roller carriers, and a locking pin extending through a radial hole formed in the bolt.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
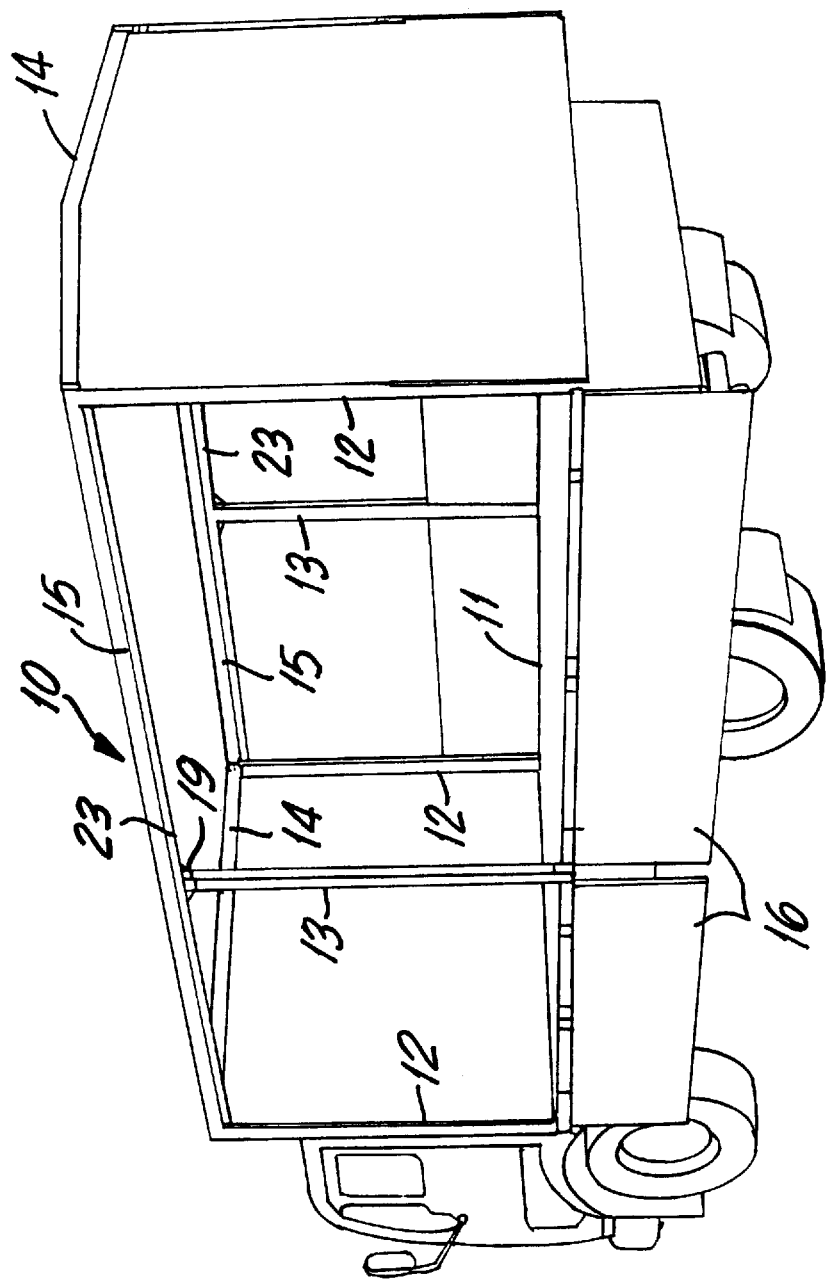
FIG. 1 is a schematic perspective view of a truck with a box-shaped cargo body.
Figure 2:
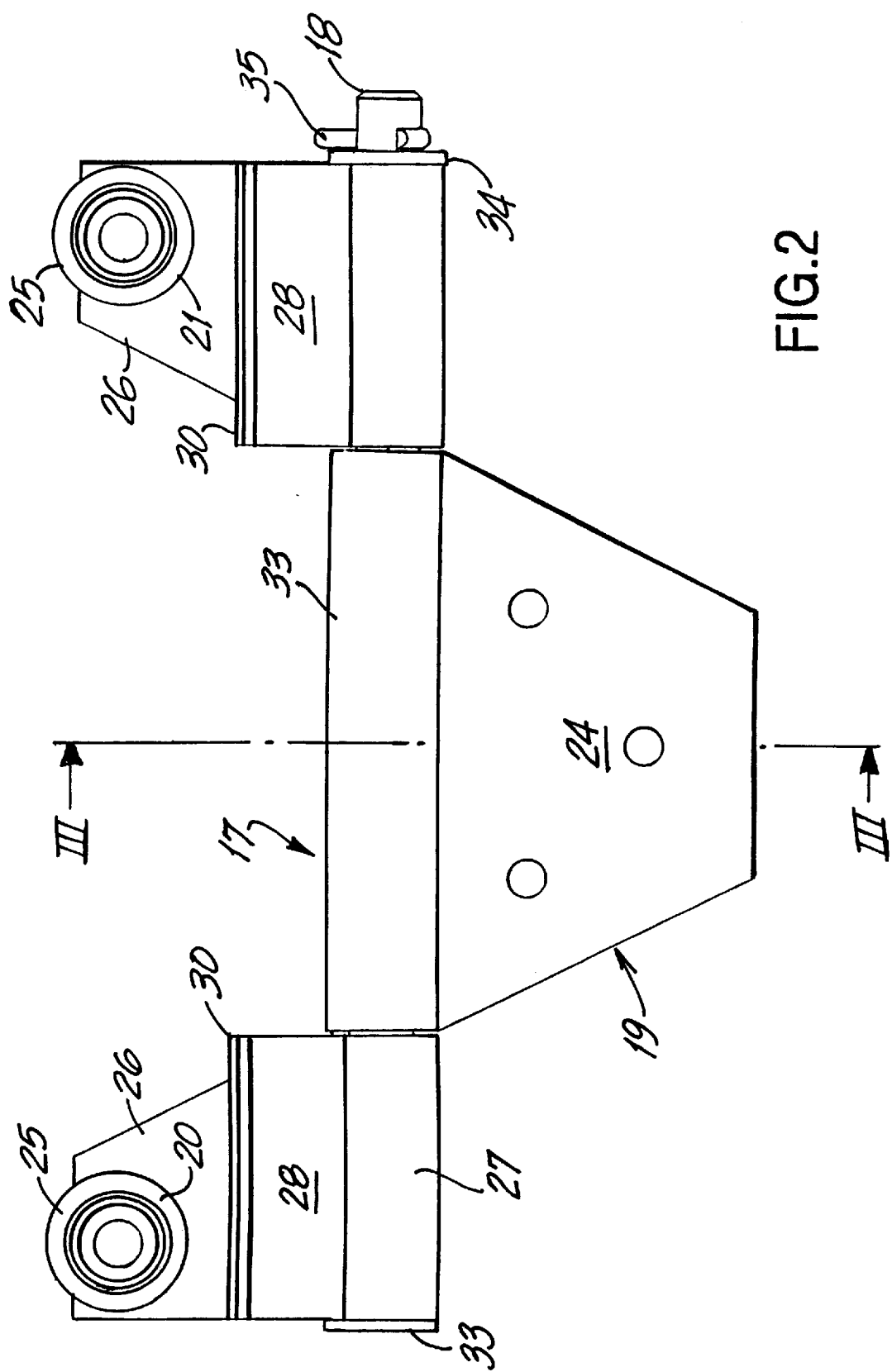
FIG. 2 is a side view of a post carriage according to the present invention.
Figure 3:
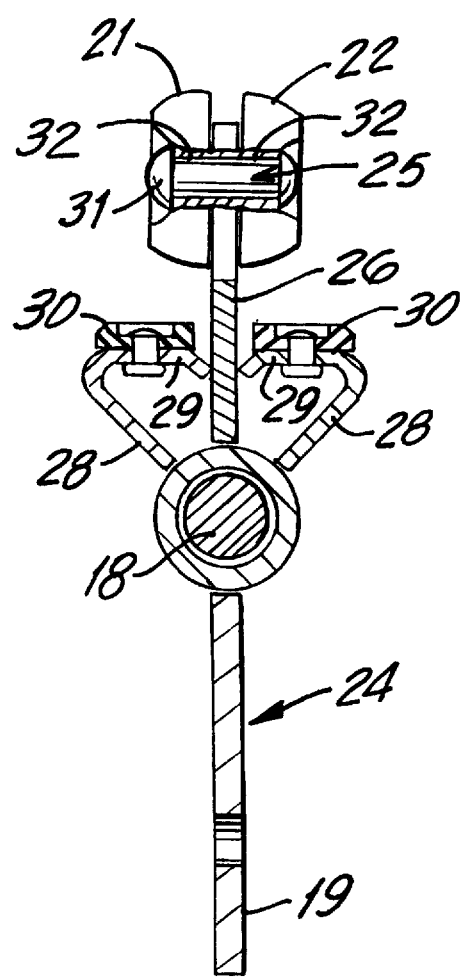
FIG. 3 is an end view of the post carriage shown in FIG. 2.

The truck shown in FIG. 1 has a box-shaped cargo body 10 formed as a canvas-covered frame. The frame is formed essentially of two side bars 15 extending along a cargo platform 11 and supported thereon by upright posts 12 and 13, and of two cross-bars 14 which connect the two side bars 15 at the front and rear ends of the cargo platform 11. The side bars 15 form the upper side edges of the cargo body 10, and the cross-bars 14 from transverse edges of the cargo body 10. In FIG. 1, the side board 16 of the cargo platform 11 is folded downward. The posts 12, provided in the corners of the cargo platform 11, are rigidly connected as with the cargo platform 11 itself so with the side bars 15 and the cross-bars 14. The posts 13, which are provided approximately in the middle of the platform 11, are releasably secured to the platform 11 at their lower ends and, at their upper ends, are connected to the side bars 15 by post carriages 17 displaceable along guide rails 23 which are provided on the side bars 15. The post carriages 17 are formed as roller trolley. The chassis of each post carriage or roller trolley 17 is formed by a support bolt 18. The post 13 is connected with the support bolt 18 by a fastening plate 19 which is supported in the middle of the support bolt 18. On each side of the fastening plate 19, there is provided a roller carrier for at least one track roller 20. The fastening or connecting plate 19 connecting the displaceable post 13 with the post carriage 17 in the embodiment, shown in the figures, is formed as a hinge plate provided at is end, which is supported on the support bolt 18, with a gudgeon 33 pivotally supported on the bolt 18. The support or hinge plate 19 has a plate region 24 to which the post 13 is attached.

The track rollers 20 are formed as twin rollers formed of two rollers 21 and 22 rotatable about a common axle 25. The roller carrier has a portion located between the two rollers 21, 22 for supporting the common axle 25 of the two rollers 21, 22.

Each of the rollers carriers of the post carriage 17 is formed of two flat sections having flat areas 26 abutting each other and connected with each other, with the connected areas defining an axle supporting portion of the roller carrier. The two flat sections of each roller carrier may be connected, e.g., by welding. At the end of the connected areas 26 remote from the axle supporting portion, the flat sections have, respectively, approximately cylindrical end portions 27 for receiving the support bolt 18 therebetween. Each of the roller carriers has two side jaws 28 arranged symmetrically with respect to the flat areas 26 for engaging the guides 23 provided on the side bars 15. The jaws 28 are provided each with a portion 29 extending parallel to the bottom of the guide 23 and carrying a support 30 formed of a wear-resistant plastic material.

The two rollers 21, 22 forming the twin roller have each a shape of a section of a ball. The common axle 25 of the two rollers 21, 22 is formed as a clinch bolt 31, on which the two rollers 21, 22 are supported by a bearing sleeve 32 formed of a maintenance-free bearing material.

The support bolt 18, which forms the chassis of the post carriage 17, is formed as a head bolt, with the head 33 of the bolt abutting the outer end surface of one roller carrier and the bolt 18 being secured at the outer end surface of the other roller carrier with a shim 34 and a locking pin 35.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A post carriage for a box-shaped cargo body of a truck including a cargo platform, two side bars extending along a longitudinal extent of the cargo platform in a spaced relationship, and plurality of upright posts for supporting the side bars on the cargo platform and including at least one post having a lower end thereof releasably attached to the cargo platform and having an upper end thereof supported at one of the side bars for displacement along the one side bar, said post carriage comprising:

means for connecting the at least one post with the post carriage;

a pair of track rollers displaceable along a guide rail provided on the one side bar for displacing the at least one post along the one side bar; and a roller trolley for supporting the track rollers, wherein the roller trolley comprises a chassis formed as a support bolt, and said connecting means comprises a connection plate supported on said support bolt, said roller trolley further comprising two roller carriers supported on said support bolt on opposite sides of said connection plate, respectively, for supporting each one of the pair of track rollers, wherein each one of the pair of track rollers comprises a twin roller and a common axle for supporting the twin roller, wherein each roller carrier has a flat portion engaging the common axle in a region between two rollers forming said twin roller, wherein each roller carrier has two jaws, arranged, respectively, sidewise on opposite sides of said flat portion for engaging the guide rail from beneath, and wherein each jaw has a portion extending parallel to a bottom of the guide rail for engaging the guide rail from beneath, said extending portion having a support region formed of a wear-resistant plastic material.

2. A post carriage for a box-shaped cargo body of a truck including a cargo platform, two side bars extending along a longitudinal extent of the cargo platform in a spaced relationship, and plurality of upright posts for supporting the side bars on the cargo platform and including at least one post having a lower end thereof releasably attached to the cargo platform and having an upper end thereof supported at one of the side bars for displacement along the one side bar, said post carriage comprising:

means for connecting the at least one post with the post carriage;

a pair of track rollers displaceable along a guide rail provided on the one side bar for displacing the at least one post along the one side bar; and a roller trolley for supporting the track rollers, wherein the roller trolley comprises a chassis formed as a support bolt, and said connecting means comprises a connection plate supported on said support bolt, said roller trolley further comprising two separate roller carriers supported on said support bolt on opposite sides of said connection plate, respectively, for supporting each one of the pair of track rollers.

3. A box-shaped cargo body for a truck, comprising:

a cargo platform;

two side bars extending along a longitudinal extent of the cargo platform, spaced from each other, and defining upper longitudinal edges of the cargo body;

a plurality of upright posts for supporting the side bars on the cargo platform, the plurality of upright posts including at least one post having a lower end thereof releasably secured to the cargo platform and having an upper end thereof supported on one of the side bars for displacement along the side bar, the one side bar being provided with a longitudinally extending guide rail; and post carriage for displacing said at least one post along the one of said side bars and including two track rollers displaceable along the guide rail, and a roller trolley for supporting said track rollers, wherein the roller trolley comprises a chassis formed by a support bolt, a connection plate supported on the support bolt for connecting the at least one post with said post carriage, and two separate roller carriers supported on the support bolt on opposite sides of the connection plate, respectively, for supporting each a track roller.

4. A post carriage as set forth in claim 2, wherein the connection plate is formed as a hinge plate having an end thereof supported on said support bolt formed as a gudgeon pivotable about the support bolt.

5. A post carriage as set forth in claim 1, wherein each roller carrier is formed of at least one folded flat material section having at one end thereof a flat portion forming the axle engaging portion of the roller carrier, and having at another end thereof an approximately cylindrical portion for receiving the support bolt.

6. A post carriage as set forth in claim 5, wherein the roller carrier is formed of two folded flat material sections forming the common axle engaging portion of said roller carrier, said two folded section abutting each other.

7. A post carriage as set forth in claim 6, wherein said two folded sections are connected with each other by welding and having each at an end thereof remote from said common axle engaging portion an approximately cylindrical section forming at least partially said support bolt receiving cylindrical portion.

8. A post carriage as set forth in claim 1, wherein said common support axle is formed as a clinch bolt, the rollers forming the twin roller being supported on said clinch bolt by a bearing sleeve.

9. A post carriage as set forth in claim 2, wherein said support bolt is formed as a head bolt having a head thereof abutting an outer end surface of one of said roller carriers and having an end thereof remote from said head projecting beyond another of said roller carriers, said remote end of said head bolt being secured to another of said roller carriers with a shim surrounding said remote end and abutting an outer end surface of said another of said roller carriers, and a locking pin.

* * * * *